March 11, 1930.                J. H. STEWART                1,750,438
                          COUNTER MOLDING MACHINE
                           Filed Dec. 17, 1928           2 Sheets-Sheet 1
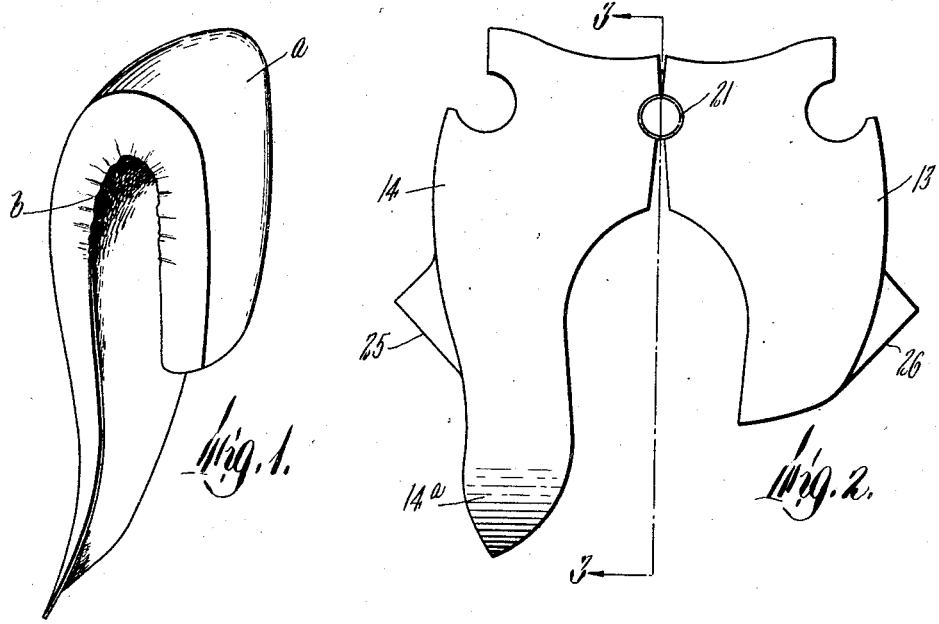
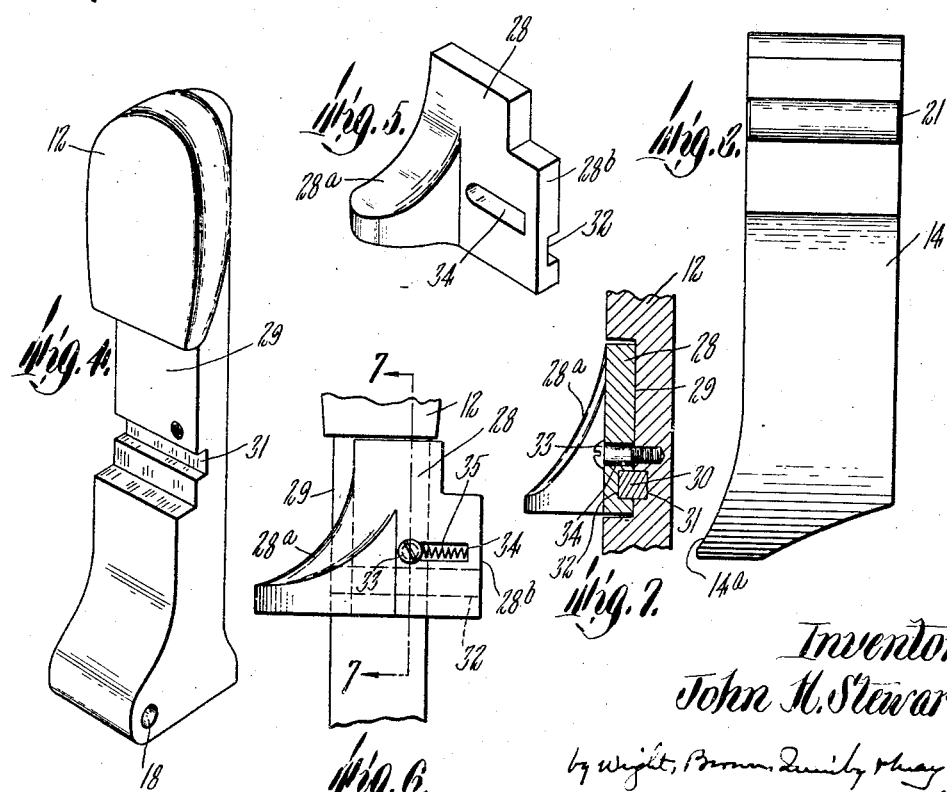
Inventor;
John H. Stewart,

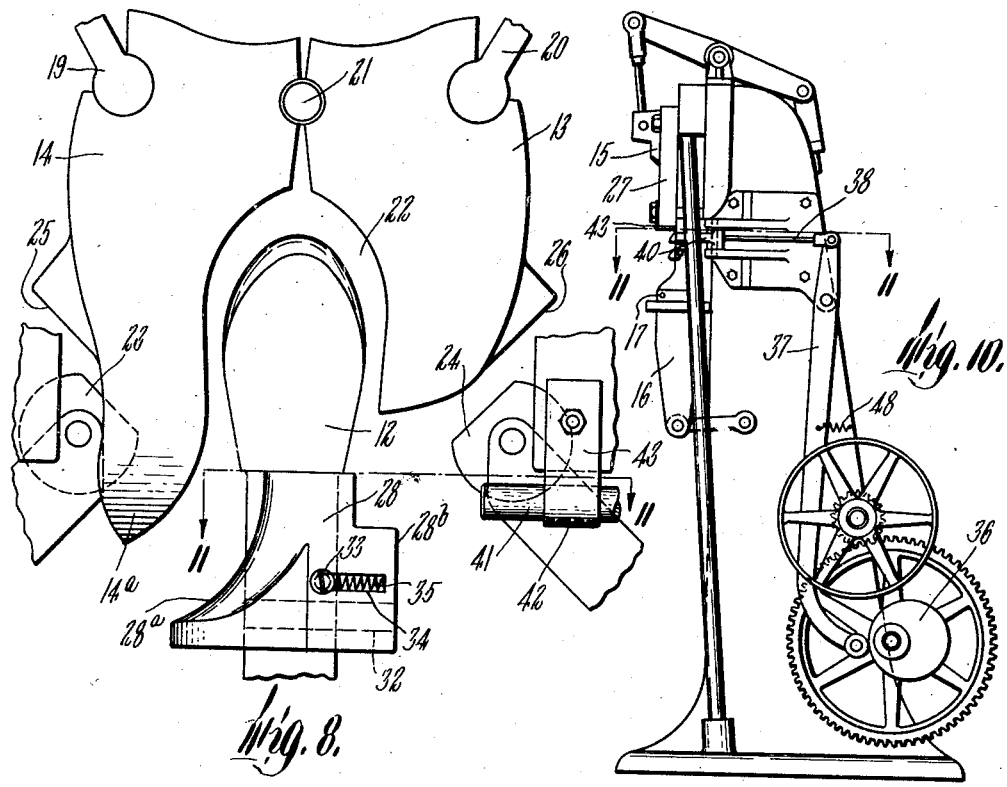
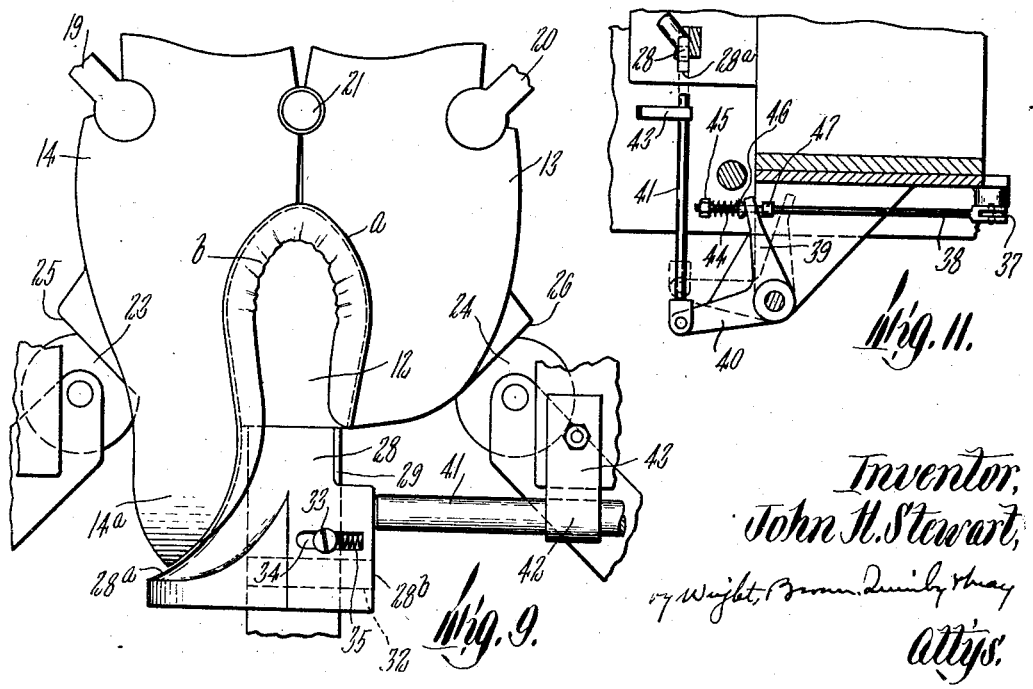

Patented Mar. 11, 1930

1,750,438

UNITED STATES PATENT OFFICE

JOHN HAMMOND STEWART, OF LYNNFIELD, MASSACHUSETTS

COUNTER-MOLDING MACHINE

Application filed December 17, 1928. Serial No. 326,616.

This invention relates to means and methods for molding the counter stiffeners (commonly called counters, and hereinafter so called) of shoes, particularly those counters which have an extension or wing on one side arranged to project forwardly alongside and partly under the instep of the shoe in order to support the arch of the wearer's foot at the inner side. It has long been recognized that the extension wings of such counters should be premolded in accurate conformity with the instep portion of the last on which the shoe is made, in order that the inherent stiffness of this part of the counter may be fully availed of to give the desired support to the foot and the desired appearance and style of the shoe, and will not oppose the effort of the operator in lasting the upper or tend to bulge out the instep portion of the upper.

Although counter molding machines employing an inner member, called a plug or last, to support a counter blank while being molded, and outer mold members to apply pressure to the blank so supported, have long been used to mold the rear parts of counters (an example of such a machine being shown in the prior patent to William C. Stewart, No. 767,473, January 19, 1892), it has not been feasible heretofore to adapt such machines for molding such extension wings as well, in one operation, with the accuracy, regularity and speed required by present day industrial conditions for the commercial production of molded counters. This is because of the manner in which the counter blanks must be presented to the molding instrumentalities. They are fed by hand; the operator picking them up one by one, (preferably after they have first been given a preliminary partial shaping with lengthwise and transverse curvature by being passed between convex and concave rolls) and bending them into a horseshoe-like curve generally similar to the space between the separated plug and mold members. The center of the curve so formed is of course in the part of the blank which becomes the extreme rear end of the molded counter; and the bending is necessarily carried so far that the extension wing is brought well inward toward the median line of the horseshoe shaped figure.

In the molded counter, however, the wing must be reversely curved and extend outward, as indicated by Fig. 1 of the drawing, and the parts of the molding means for so shaping the wing must be curved accordingly.

Accordingly, the problem with which I have been confronted in accomplishing the object of molding a wing counter in one operation, has been to make possible the insertion of the counter blank, when held and bowed in the manner above described, into the narrow space between the molding members without causing interference of the wing with the outwardly curved part of the inner member or plug; for such interference would tend to cock or tilt the blank and cause it to be improperly placed between the molding members, and on account of the high speed at which such machines must be run in commercial operation, there is not enough time during the periods when the molds are open to permit the operator to carefully arrange the stiff counter blank in a narrow reversely curved channel. The operator has only time to perform the simple motions of grasping the blank, bending it in a bowed form while transferring it to the mold, and rapidly placing it in the space between the parts of the mold. In doing this he must see that the part of the blank which forms the rear end of the molded counter is placed at the center of the horseshoe curve, and he has no time and attention to spare in trying to bend the wing additionally so that it will not interfere with an outwardly curved extension on the plug member of the mold.

I have solved this problem and accomplished my object by providing on the plug or last member of the molding instruments an extension piece, which cooperates with an extension wing on one of the mold members to shape the wing of the counter, and is automatically displaced to one side when the molding instruments are separated, and automatically advanced into operative position when said members are brought together in molding the counter. The invention consists in the means and combinations of parts which I have devised for this purpose and have illustrated in the accompanying drawing, and in all substantial equivalents of such means and combinations.

In the drawings,—

Fig. 1 is a perspective view of a molded wing counter, the product of my improved machine;

Fig. 2 is a front elevation of the outer molding instruments of my improved counter molding machine, these instruments being commonly called the molds;

Fig. 3 is a side elevation as seen from line 3—3 of Fig. 2, of the molding member which has the wing molding extension;

Fig. 4 is a perspective view of the plug or last, being the inner molding member, without the wing molding attachment;

Fig. 5 is a perspective view of the displaceable wing molding attachment for the plug or last member;

Fig. 6 is an elevation of that part of the plug or last member which holds the wing molding attachment, with the latter in place;

Fig. 7 is a sectional view of the part shown in Fig. 6, taken on line 7—7 of the latter figure;

Fig. 8 is a front elevation of the assembled counter molding instruments in operative relationship and in the separated or open position which they assume for reception of a blank to be molded;

Fig. 9 is a similar view of the instrumentalities showing them after conclusion of a molding operation with the molded counter gripped between them;

Fig. 10 is a side elevation of a counter molding machine, of previously known character, by which the molding instrumentalities above described are operated;

Fig. 11 is a fragmentary plan view and horizontal section taken on line 11—11 of Fig. 10.

Like reference characters designate the same parts wherever they occur in all the figures.

The plug or last member 12, which I will generally refer to for brevity in the following description, as the plug simply, cooperates in the usual way with mold members 13 and 14 to shape the rear part of a counter $a$, and with a flange plate or presser 15 (Fig. 10) to bend over sharply and flatten a flange $b$ at the bottom of the counter adapted to overlap the heel end of the innersole of the shoe in which it is placed and to be secured, together with the upper, to that part of the innersole in the way familiar to shoe makers. The plug is supported by the plug carrier 16 of the machine, to which it is connected by a pivot 17 (Fig. 10) occupying a passage 18 (Fig. 4) in the forward part of the lower end of the plug, whereby the latter is enabled to be tilted forward for discharge of the molded counters. The mold members are suspended by links 19 and 20 at the upper part of the machine where they embrace the plug, and are engaged with one another through a fulcrum pin 21. The plug carrier 16 is raised and lowered by mechanism which is not shown in these drawings because it is of a type and character well known to those acquainted with the art and shown in previously granted patents. It is sufficient to say that when the plug is lowered the counter blank may be placed in the open horseshoe shaped space 22 shown in Fig. 8 between the plug and mold members and that, on being raised, it forces the blank against the molds at the inner end of the cavity formed in and between them. At the same time wipers 23 and 24, likewise carried by the plug carrier 16, engage inclined surfaces 25 and 26, respectively, on the mold members, and crowd the latter firmly against the sides of the plug. The flange plate 15 is moved downward in its guides 27 and passes across the front faces of the molds and plug, passing over the edge part of the counter blank, which protrudes from between the plug and molds bending over and flattening the flange $b$.

As thus far described the machine and molding members do not differ essentially from those previously known and used. The features novel with this invention consist in an extension wing $14^a$ on the mold 14 and an attachment 28 for the last having a mold extension $28^a$ complemental to the inner surface of the mold extension $14^a$. The complemental surfaces of these extensions have approximately the same contours as the last to which the counter is required to conform, or at least have such a relation to the contours of the last as will cause the counter when applied thereto in connection with the shoe upper to hug the last closely at the inner side of the instep portion thereof. The extension $28^a$ projects laterally and forwardly from the plug proper and is concave in the part which adjoins the molding surface of the plug, while the mold extension $14^a$ is complemental to it in all respects.

The attachment 28 is laterally retractible away from the mold extension in order to provide room for the operator's fingers when placing the counter blank in position to be molded. To this end the attachment is placed in a recess 29 in the forward side of the plug body, and is fitted to a guide bar 30 which occupies a groove 31 in the forward side of the plug body and a groove 32 in the rear side of the attachment, being made fast to one of them, no matter which. A screw 33 passes through a slot 34, parallel to the guide bar 30, in the attachment 28, and a spring 35 is placed in the slot, between the screw and the end of the slot which is more remote from the mold extension. By these means the attachment is securely connected to the plug, with freedom for lateral movement, and is constantly acted on by force tending to withdraw it from the complemental mold member. It is brought into molding position and held there, when the plug is brought up to cooperate with the molds, by the following mechanism.

A cam 36 (Fig. 10) carried by a driven shaft of the machine, acts on one arm of a lever 37, the other arm of which is connected pivotally to a link 38. The link 38 in turn is coupled with one arm 39 of a bell crank lever (Fig. 11), the other arm 40 of which is connected to a rod 41 which projects toward the attachment 28 and is adapted to thrust against the same. The rod 41 is supported by a guide 42 which is part of a strap 43 attached to the flange presser guide 27 and extending rearwardly beneath the same. When the plug is raised into the molding position, a shoulder 28$^b$ on the attachment 28 is brought into line with the rod 41. The cam 36 is so timed with respect to the movements of other parts, that the rod is then advanced far enough to thrust the plug attachment into a position where it will bear strongly against the wing extension 14$^a$. It will be noted from Fig. 11 that the force exerted by the cam is transmitted yieldingly to the thrust rod 41, through the medium of a spring 44 surrounding a part of the link 38 which protrudes beyond the bell crank arm 39 after passing through an opening in said arm. The spring is confined between an abutment nut 45 threaded on the rod and a sliding collar 46 which transmits the pressure of the spring to the bell crank lever. Thus although the plug extension 28$^a$ is pressed against the wing of the mold with as great a pressure as may be desired by the provision of a suitably powerful spring, it is nevertheless able to yield in compensation for counter wings of excessive thickness. However, it is in my contemplation to omit the spring and make the transmission mechanism rigid throughout. On the other hand, an equivalent yielding connection may be provided elsewhere in this transmission mechanism. A fixed collar 47 on the link 38 causes the thrust rod 41 to be retracted when the receding part of the cam 36 passes the lever 37, the latter being impelled by a spring 48 to follow such receding surface.

It will be seen from Fig. 8 that the lateral displacement of the plug attachment 28 leaves a space between the forming extension thereof and the complemental extension of the adjacent mold into which the wing of the bowed counter blank may be placed without any substantial interference with the attachment. If there is any interference it will be limited to the extreme tip of the blank which, being skived to a thin edge, is more flexible than the body part of the blank; and that without such recession the wing would cross and extend far beyond the forming surface and would be greatly obstructed. It is to be remembered that the part of the blank available for gripping by the operator's fingers is only the edge part which projects from between the molding members and is afterwards bent over to form the flange, wherefore the operator's grip on the blank is not so firm and secure as would be the case if he could grasp it throughout its full width. So such an obstruction would be very liable to tilt the blank and cause it to be improperly placed. But actually such liability is eliminated by the recession of the attachment.

It will also be understood that sets of molding means are made according to the invention for the right and left members of a pair of counters. The set here shown is designed for molding a right counter, the wing of which is designed to support the arch at the left side of the wearer's right foot. Those for molding the left member of the pair are similar but reversed.

By this invention I have made it possible to mold an extension wing counter, including the wing thereof, in one operation without sacrificing any of the speed or accuracy incident to the practices previously used to mold the rear parts only of counters.

What I claim and desire to secure by Letters Patent is:

1. A counter molding machine of the type employing complemental inner and outer molding members and a flange presser and having extensions on the inner and one of the outer molding members complementally formed to mold the extension wing of a counter in substantial conformity with the instep portion of a last, one of said extensions being laterally displaceable from the other to provide space for accommodating the wing of a counter blank when being placed in position to be molded.

2. A counter molding machine of the type having an inner molding member or plug, outer molding members embracing such plug, and means for causing said inner and outer members to grasp and compress a counter blank between them, one of said outer members having an extension approximately complemental to the instep curvature of a shoe making last, an attachment mounted on said plug member having an extension with a molding surface similar to the instep curvature of such last, and complemental to the above named mold extension, means for retracting said attachment from the mold extension when the said members are separated for reception of a blank, and means for moving and pressing the attachment toward the mold extension when the parts are in position to mold a counter.

3. In a counter molding machine of the type employing an inner mold member or plug and cooperating outer mold members, an attachment mounted on the plug having an extension for shaping the extension wing of the counter and being movably connected to the plug in a location and with provisions for movement enabling its molding surface to be brought into register with an extension of the molding surface at one side of the plug end and of being retracted therefrom, the outer mold member at the adjacent side of the plug having an extension complemental to the molding surface of said attachment, and means for withdrawing and advancing said attachment.

4. In a counter molding machine of the type employing an inner mold member or plug and cooperating outer mold members, an attachment mounted on the plug having an extension for shaping the extension wing of the counter and being movably connected to the plug in a location and with provisions for movement enabling its molding surface to be brought into register with an extension of the molding surface at one side of the plug and of being retracted therefrom, the outer mold member at the adjacent side of the plug having an extension complemental to the molding surface of said attachment, means tending constantly to withdraw said attachment, and intermittently acting means for advancing the attachment into cooperating relation with the extension of the outer mold.

5. In a counter molding machine, recessed molding members, a plug adapted to enter the recess within said members, one of the molding members having an extension with a molding surface complemental to the instep portion of the last for which the counter is designed, an attachment to the plug having an extension complemental to the before named extension and mounted on the plug with provision for receding from the mold extension, and means for forcing said attachment toward the mold extension when the plug and mold members are in position for molding a counter.

6. In a counter molding machine, a plug having surfaces complemental to the interior of a molded counter, an attachment having a forming surface similar to the instep portion of a last for shaping an extension wing of the counter, mounted adjacent to and in continuation of the forming surface at one side of the plug, means constantly tending to retract said attachment from the last named surface of the plug, external mold members adapted to embrace the plug, one of said members having a wing molding extension complemental to the forming surface of said attachment, and means for forcing the attachment with a yielding pressure toward the said mold extension when the plug and molds are in position for applying molding pressure to a counter blank.

7. A counter molding machine comprising interior and exterior molding members complementally formed to the prescribed shape of a shoe counter and having extensions at one side for molding an extension wing of such a counter, means for exerting pressure between said members, and means for additionally exerting pressure laterally between said extensions.

8. A counter molding machine comprising interior and exterior molding members complementally formed, respectively, to occupy and embrace, and mold, an entire shoe counter, including an extension wing on one side of such counter, and means for exerting pressure between said members and between the extension-wing-molding portions thereof.

9. Molding instruments for a counter molding machine comprising an inner molding member or plug having a laterally movable attachment provided with a molding surface similar in contour and relative position to the instep part of a shoemaking last, and outer molding members adapted to embrace said inner member and complementally formed for molding cooperation therewith; one of said outer members having an extension complemental to said attachment.

In testimony whereof I have affixed my signature.

JOHN HAMMOND STEWART.